INVENTORS
Howard W. Christenson,
William G. Livesey &
Ulysses A. Brefing
BY T. L. Chisholm
ATTORNEY

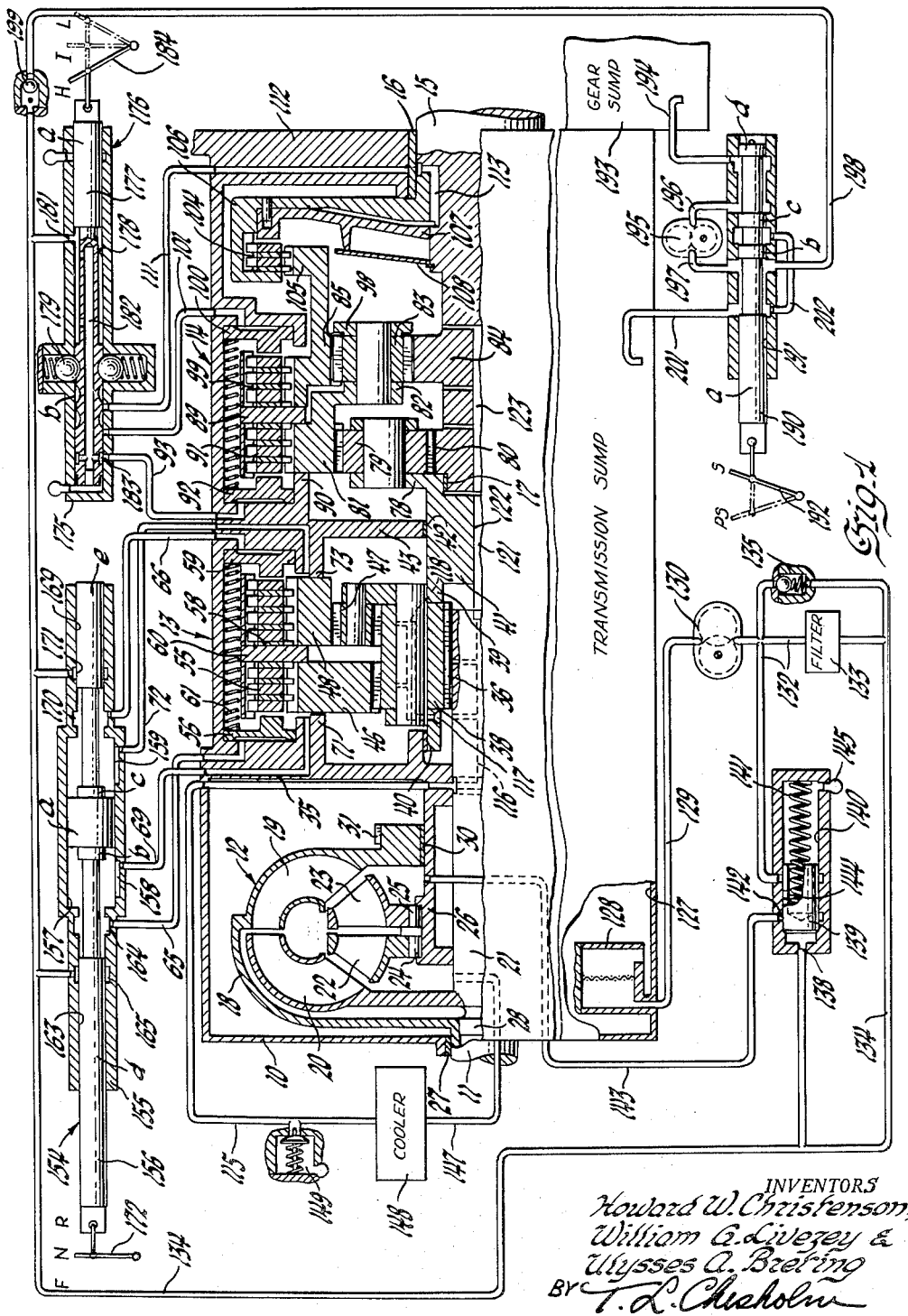

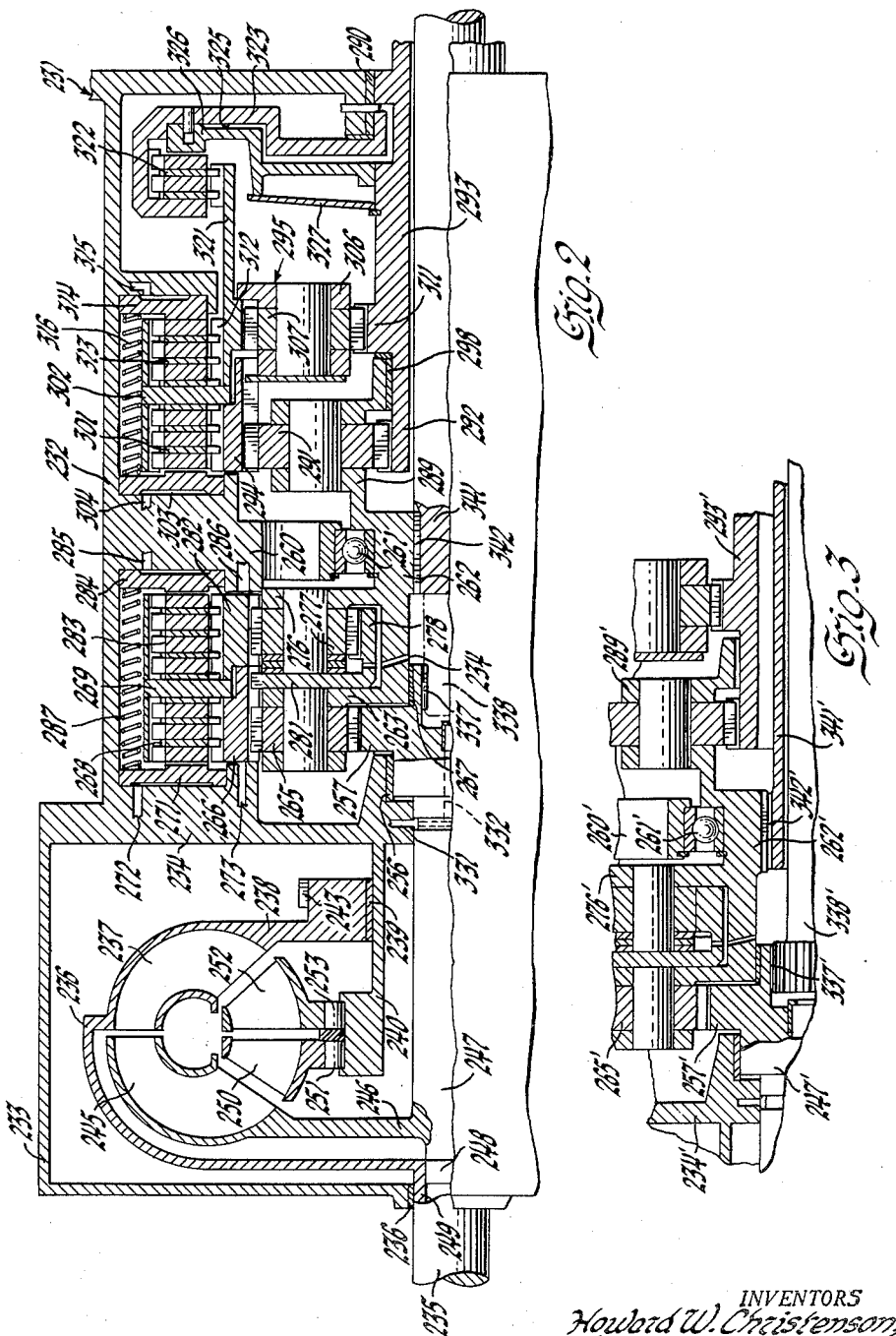

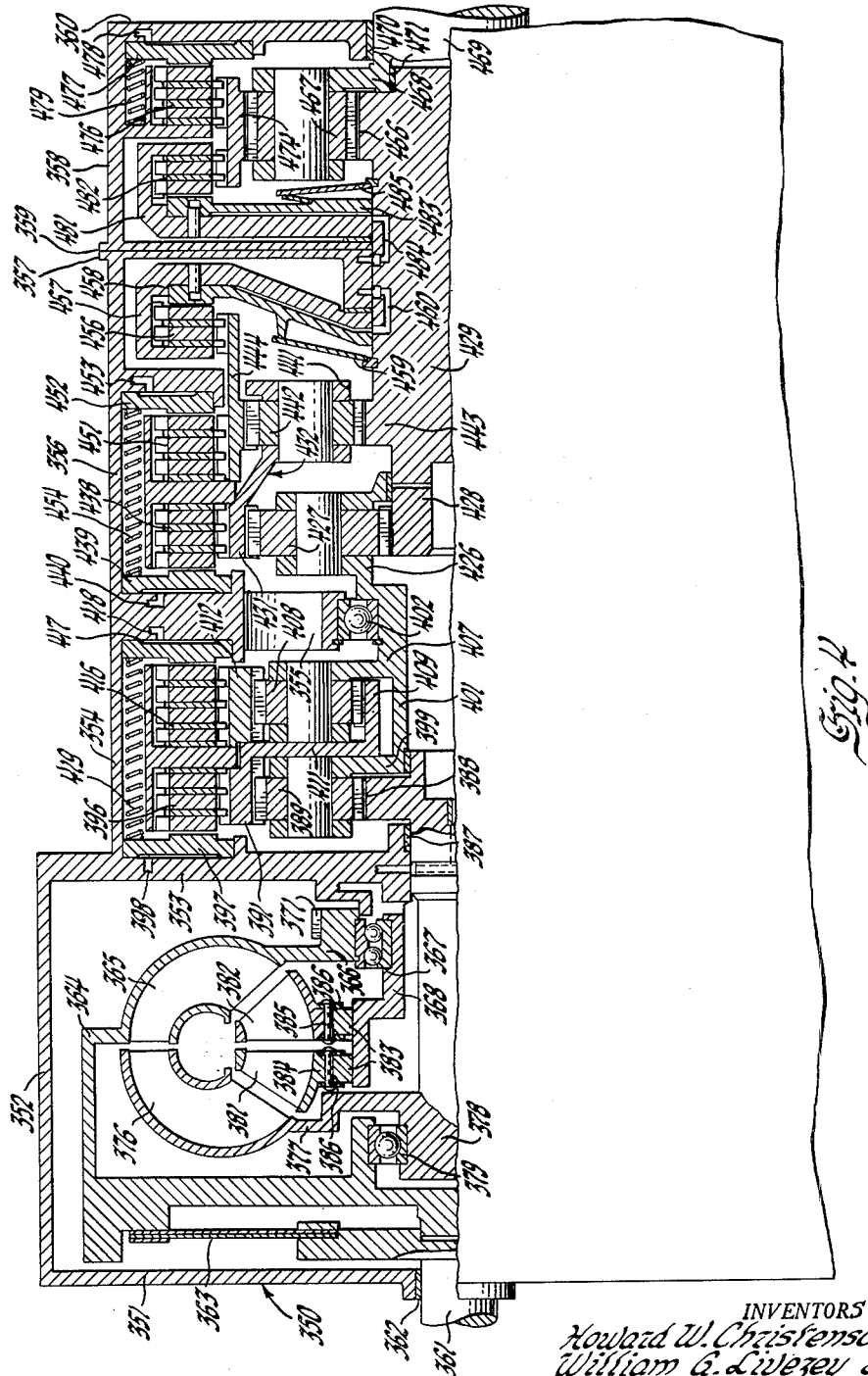

United States Patent Office 3,016,769
Patented Jan. 16, 1962

3,016,769
TRANSMISSION
Howard W. Christenson, William G. Livezey, and Ulysses A. Breting, Indianapolis, Ind., assignors to General Motors Corporation, Detroit, Mich., a corporation of Delaware
Filed May 18, 1955, Ser. No. 509,298
25 Claims. (Cl. 74—732)

This invention relates to a multiple drive ratio transmission and more particularly a multiple drive ratio planetary transmission and the remote controls for operating the transmission to effect various drive ratios.

The transmission provides a wide range of ratio variation by employing in combination, a hydrodynamic torque converter, a forward and reverse gear unit and a three speed or ratio gear unit. Since the converter is always in the drive train, the three speed gear unit may have rather large drive ratio change steps and thus provide in the overall a large change in ratio. It is contemplated that the three speed transmission unit would initially be placed in the first or low drive ratio by manual actuation of the selector valve and thereafter the forward and reverse valve will be manually moved from neutral to either forward or reverse position to place the forward and reverse gearing in either forward or reverse drive. In this way the transmission provides three ratios in either forward or reverse drive. The forward and reverse drive gearing provides a reduction gear ratio in the forward range and a larger reduction gear ratio in the reverse range. Thus in combination with the reduction forward and reverse gearing, a three speed overdrive unit having a low ratio provided by a one-to-one direct drive and an intermediate ratio provided by an intermediate dual planetary overdrive and a high ratio provided by a single planetary overdrive arrangement. This arrangement permits a very economical use of gearing to transmit the torque through the transmission.

The forward and reverse valve controls both the supply of fluid to the forward and reverse servo motors and the supply of lubricating and cooling fluid to the forward and reverse clutch plates. This valve supplies the lubricating oil and cooling oil only during the time when the clutch plates are moving into engagement and discontinues the supply as soon as the clutch plates are substantially fully engaged. In addition, the valve is unbalanced so that the fluid pressure acting upon the piston of the servo motor to engage the ground clutch also acts upon an unbalanced area of the valve so that the operator may feel a force tending to resist movement of the valve which reflects and is a measure of the force acting upon the clutch plates during engagement of the ground clutch to effect either forward or reverse drive.

The valve is provided with suitable lands so that when the valve reaches either the terminal forward or reverse position and the servo motor is normally completely actuated to fully engage the clutch, the valve closes the passage permitting the fluid in the servo motors to reach the unbalanced area of the valve and simultaneously vents the fluid acting upon the unbalanced area of the valve. Since there is no force tending to return the valve from the terminal forward or reverse position to the neutral position, the operator may leave the valve at rest in either the forward or reverse position.

A push start and scavenge pump control arrangement is provided by a push start and scavenge pump control valve which may be positioned to connect a pump driven by the rear wheels to scavenge a gear box for the final drive or other mechanism employed in conjunction with the transmission and to deliver this oil to the transmission sump. If it is desired to obtain operating fluid for the transmission controls during a push start, the valve is moved so that oil is pumped from the transmission sump and is delivered through a check valve to the transmission controls, the forward and reverse selector valve and the three-speed selector valve.

The transmission may also be provided with a hollow or sleeve output shaft so that two concentric power take-off shafts may be employed. One is connected to the output shaft of the forward and reverse planetary gear set to provide a converter drive at a reduced ratio in either a forward or reverse direction. The other power take-off shaft is connected directly to the converter to provide an engine drive directly through the converter. If solid power take-off shafts are employed, they may be installed individually when either type of drive is required.

A transmission may also be provided having a hydrodynamic torque converter driving a two ratio forward and reverse gear set in combination with the three ratio gear set and a final drive two ratio unit. In a transmission of this type, six speeds in both forward and reverse may be provided.

An object of the invention is to provide in a transmission a two ratio forward and reverse planetary gear set providing a forward and reverse reduction drive and a three ratio planetary gear driven by said forward and reverse planetary gear set wherein the three ratio planetary gear provides a one-to-one direct drive for the low range, a dual planetary overdrive for the intermediate range and a single planetary high overdrive for the high range.

Another object of the invention is to provide a control system for a multiple ratio gear set having friction devices to complete various ratios, a control valve providing cooling oil during initial stages of clutch engagement and blocking the flow of cooling oil when the clutch is fully engaged.

Another object of the invention is to provide in a hydraulic control system for controlling a servo motor, a valve having an unbalanced area which is responsive to the pressure in the servo motor whereby the valve resists movement during the initial actuation of the servo motor until the valve reaches a terminal position where flow to the unbalanced area of the valve is terminated and the fluid acting on the unbalanced area is vented to exhaust so that the valve will remain in the engaged position.

Another object of the invention is to provide a push start control system where one position of the push start and scavenger pump control valve, the push start pump driven by the vehicle road wheels, takes oil from the transmission sump and delivers it through a check valve to the transmission control system and the other position of the push start and scavenger pump valve, the pump takes oil from the gear sump and returns it to the transmission sump.

Another object of the invention is to provide in a multiple speed transmission having an output sleeve shaft, a first power take-off shaft located in said output sleeve shaft driven by the hydrodynamic torque converter and the forward and reverse reduction gearing through an intermediate sleeve shaft and a second power take-off shaft located in said output sleeve shaft driven by the hydrodynamic torque converter output shaft.

Another object of the invention is to provide a transmission drive employing a torque converter connected to drive a forward and reverse planetary gear unit which in turn drives a three ratio planetary gear unit and a two ratio planetary gear unit to provide six speeds in forward or reverse.

These and other objects of the invention will be more apparent from the following description and drawing of the preferred embodiments of the invention.

FIG. 1 is a diagrammatic view showing the transmission structure and the control system with parts broken away and in section to show details.

FIG. 2 is a diagrammatic view of the modified transmission with parts broken away in section to show the details.

FIG. 3 is a view of another modified transmission similar to the transmission of FIG. 2 with parts broken away and in section to show the details.

FIG. 4 is a sectional view of another modified transmission.

Figure 5:
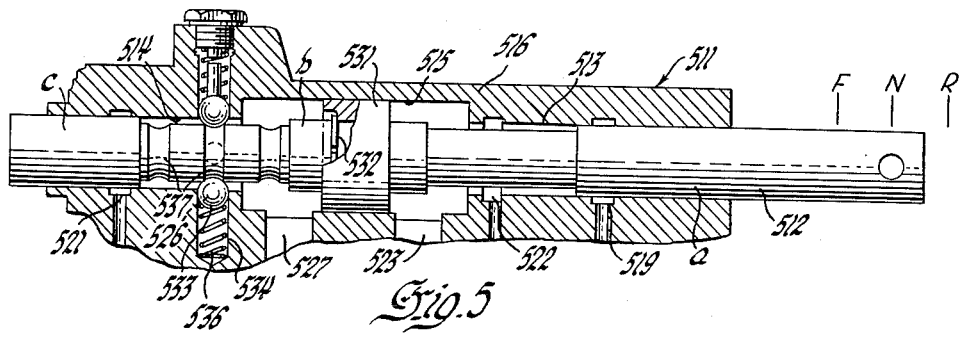
FIG. 5 is a sectional view with parts broken away and in section of a modified forward and reverse control valve.

Referring to the drawing, FIG. 1, the transmission mounted in housing 10 has an input shaft 11 connected by the hydrodynamic torque converter unit 12, the forward and reverse planetary gear unit 13 and the three-ratio planetary gear unit 14 to drive the output shaft 15. The input shaft 11 is connected to the rotary torque converter housing 18 which carries the impeller blades 19. The turbine blades 20 are mounted in a runner secured to the torque converter output shaft 21. The stator blades 22 and 23 are mounted on runners connected by the one-way clutches 24 and 25 respectively, to the ground sleeve 26, a fixed portion of the housing 10. The fluid is circulated from the impeller 19 to the turbine 20 and reacts against the stator blades 22 and 23 in the conventional manner to transmit and multiply torque from the engine shaft or input shaft 11 to the converter output shaft 21. The rear portion of the converter housing 18 is mounted by means of a suitable thrust bearing 30 on the ground sleeve 26 and may also carry a gear 31 to drive suitable accessories.

The converter output shaft 21 is rotatably supported in a partition 35 of the housing 10 which divides the converter section 12 from the forward and reverse gear section 14 of the housing. The converter output shaft 21 has a portion located in the forward and reverse portion of the transmission housing on which a sun gear 36 is secured. The sun gear 36 meshes with the long planetary pinions 38 mounted on the carrier 39. The carrier forms the driven element of the forward and reverse gear set and is rotatably mounted by a thrust bearing 40 located between annular extensions on the carrier 39 and housing partition 35. The carrier 39 is secured to the intermediate sleeve shaft 41 which is rotatably mounted by a thrust bearing 42 in the central partition 43 of the housing 10. The forward portion of long planetary pinions 38 mesh with the forward ring gear 46 while the rear portion meshes with the reversing planetary pinions 47 which are also mounted on carrier 39. The pinion 47 meshes with the reverse ring gear 48. A multiple plate ground clutch 55 consisting of a plurality of plates each alternately splined to the ring gear 46 and to the housing 10 is actuated by a servo motor 56 consisting of an annular cylinder formed in the housing 10 and an annular piston in the cylinder having an annular actuating face engaging the end clutch plate. The reverse ground clutch 58 similarly has alternate plates splined to the reverse ring gear 48 and the frame 10 and is actuated by a servo motor 59 which has an annular cylinder formed in the housing 10 and an annular piston located therein having an annular face portion engaging the reverse ground clutch 58. The forward and reverse clutches 55 and 58 have a fixed abutment 60 formed as a portion of the housing 10 located between the clutches. A plurality of coil springs 61 located in axial bores in the housing 10 between the servo motors engage the facing surfaces of the servo motor pistons to disengage both clutches.

The actuating fluid is supplied by line 65 to the forward servo 56 and by line 66 to the reverse servo 59. Lubricating oil is supplied to the forward clutch by line 69 which extends through the partition 35 of the housing 10 and extends laterally to discharge the lubricating and cooling oil at the side of ring gear 46 just inside of the disks of clutch 55. The partition 35 has the projection 71 which has an annular portion spaced from the ring gear 46 and an annular portion engaging the side surface of the ring gear 46. Since the lubricating and cooling supply line 69 is discharged into the annular portion spaced from the side of gear 46, the gear 46 then distributes the oil circumferentially so that the entire clutch disks are cooled. The projection 71 engages the gear 46 to provide an annular thrust abutment and guides the lubricating oil outwardly to the clutch disks. Since spur gears are employed in this transmission, the contact between the housing projection or portion 71 and the gear 46 is sufficient to provide the thrust bearing capacity necessary to maintain the gearing in axial position. The lubricating and cooling oil for the reverse clutch is delivered by the line 72 which extends through the central partition 43 and is discharged axially adjacent the rear side of reverse ring gear 48. The partition 43 has a projection 73 having an annular portion spaced from the gear 48 into which the lubricating and cooling oil is discharged by the line 72 so that it is distributed circumferentially on the clutch plate disks. The projection 73 has an annular surface which engages the reverse ring gear 48 and acts as a thrust bearing to hold the gear axially in position.

The forward and reverse gear unit 13 drives the intermediate shaft 41 which is connected to the input carrier 78 of the three speed planetary unit 14. The carrier 78 carries planetary pinions 79 which mesh with a small sun gear 80 on the output shaft 15 and the high ring gear 81. The ring gear 81 is formed as an integral part of the carrier assembly 82 for the planetary pinion 83 which mesh with a large sun gear 84 on the output shaft 15 and the intermediate ring gear 85. The carrier assembly 82 has a portion above the ring gear 81 which holds the assembly in lateral position by fitting between the fixed annular abutment 89 of the housing and the annular lateral extension 90 of the partition 43 of the housing, both of which act as thrust bearings. The ring gear 81 is stopped or connected to the housing to provide the high gear ratio by the high ground clutch 91 which consists of a plurality of annular plates with alternate plates being splined to the gear 81 and the housing 10. One end plate of the clutch 91 engages the fixed abutment 89 and the other end plate is engaged by the actuating servo motor 92. The servo motor consists of an annular piston having a face engaging the end plate located in an annular cylinder formed as a chamber in the housing 10. The high ratio servo motor 92 is actuated by fluid supplied by the line 93.

The intermediate ratio ring gear 85 has an upwardly extending projection which engages the fixed abutment 89 to prevent forward axial movement and a shoulder adjacent the gear teeth which is engaged by an end plate 98 of the carrier 82 to prevent rearward axial movement. The ring gear 85 is connected to the frame for intermediate ratio by the intermediate ground clutch 99 which consists of a series of alternate plates secured by suitable splines to the ring gear 85 and the housing 10. This group of plates engage at one end a fixed abutment 89 and at the other end engage an annular surface on the piston of the servo motor 100. The servo motor piston is located in a cylinder formed in the housing which is supplied with fluid by the line 101.

The direct drive clutch 104 consists of a plurality of clutch disks alternately splined to a rearwardly extending sleeve 105 of the intermediate ring gear 85 and to the annular cylindrical portion of the clutch housing 106. The clutch housing 106 also has a disk portion suitably connected to the output shaft 15. The clutch housing 106 has formed therein a recess providing an annular cylinder for the annular clutch actuating piston of servo motor 107. The piston of servo motor 107 is normally held in a retractive position by the annular disk spring 108 which is suitably positioned by a snap ring on shaft 15. The high clutch servo 107 is supplied with operating fluid by a line 111 passing through the rear partition 112 through a transfer groove to the axial passage 113 in the shaft 15.

The transmission lubricating oil is supplied to the transmission through the line 115 which passes through the partition 35 via a transfer bearing to the axial passage 116 in the shaft 21. One branch of the passage 116 throws the oil radially outward to an annular groove 117 located in the inner cylindrical surface of the carrier 39. This groove is connected by the passage 118 in the shaft of carrier 39 from which the oil is transmitted to the bearings and planetary gears by suitable radial passages. Another radial branch of passage 116 extends to the root of the gear teeth of sun gear 36 to lubricate the sun and pinion gears. The tube 121 bridges the gap between the oil passage 116 in the shaft 21 to the passage 122 in the intermediate shaft 41 and between passage 122 and the passage 123 in the output shaft 15.

The tube 121 has a small aperture to pass a controlled amount of lubricating oil between the converter output shaft 21 and the intermediate shaft 41 and in another radial aperture between the intermediate shaft 41 and output shaft 15 to supply lubricant to the gearing. The passage 123 has radial branch passages located adjacent the rear face of the sun gear 80 and both faces of sun gear 84 to supply lubricant to the gearing.

The converter housing 18 is rotably mounted and axially fixed to the ground sleeve 26 by thrust bearing 30 and rotatably and axially movably mounted in housing 10 by bearing 27 to permit movement due to expansion of the housing. Shaft 21 is rotatably mounted and axially fixed in input shaft 11 by thrust bearing 28. The intermediate shaft 41 is rotatably supported and axially located by thrust bearing 42 and rotatably supported by bearing 40. Since straight planetary gearing is used, the ring gears 46 and 48 are centered on the pinions and axially located by engaging the housing projections 71 and 73 and the abutment 60. The output shaft 15 is rotatably and axially located by thrust bearing 16 in the housing and rotatably mounted in pilot bearing 17 permitting axial movement relative to shaft 41. The axial movement between shafts 21, 41 and 15 is thus accommodated in the gearing. Ring gear 81 and attached carrier 82 are centered on pinions 79 and sun 84 and are axially located by the abutment 89 and projection 90. Ring gear 85 is centered on pinions 83 and axially located by abutment 89 and shoulder 98 on carrier 82.

*Control system*

The oil for actuating and lubricating the transmission is drawn from the transmission sump 127 into a conventional sump strainer 128 and via line 129 to the pump 130. The pump supplies oil via line 132 to the filter 133 which is connected to the main pressure line 134. A suitable by-pass check valve 135 connects the lines 132, 134 to provide a by-pass around the filter 133. The main pressure regulator valve 139 is located in a suitable bore 140 and held in closed position by spring 141 to block fluid flowing from the main line 134 to the converter feed line 143. When the main line 134 reaches the regulated pressure, it will enter at port 138 and move the valve 139 and compress spring 141 to open the port 142 to the converter feed line 143. When the converter is filled and the pressure line 134 continues to rise, valve 139 moves further to the right and apertures 144 in the valve 139 are aligned with branch line 132 to connect the pump outlet line 132 through apertures 144 of valve 139 to the sump via the exhaust port 145. The converter outlet line 147 passes through the cooler 148 to the lubricating oil line 115. The pressure in the lubricating line is limited by pressure regulator valve 149.

The forward and reverse gearing 13 is controlled by the forward and reverse valve 154 consisting of a valve member 156 having a large central land *a* and adjacent lands *b* and *c* and end lands *d* and *e* of reduced diameter. The large land *a* is located in a large diameter bore 157 in valve body 155 having an elongated port 158 adjacent one end connected to the forward clutch lubricating and cooling line 69.

Another elongated port 159 is located adjacent the other end of the large bore 157 and is connected to the reverse clutch lubricating and cooling line 72. The lands *b* and *d* of valve 156 fit in a small diameter bore 163 which has a port 164 located near bore 157 and connected to the line 65 for the front servo 56 and a port 165 located beyond port 164 and connected to the main line 134. The lands *c* and *e* slidably fit in the bore 169 having the port 170 located near bore 157 and connected to the line 66 supplying the reverse servo and a port 171 located beyond port 170 connected to main line 134. The valve 156 is operated by suitable linkage connected to a control handle 172 which may be moved from the neutral position illustrated to either a forward or reverse position, indicated by F and R.

*Forward and reverse valve*

A modified forward and reverse valve 511 which is illustrated in FIG. 5 is similar to the forward and reverse valve 154 illustrated in FIG. 1. The valve member 512 is slidably mounted in a bore having end portions 513 and 514 of equal diameter and a central portion 515 of larger diameter located in the valve body 516. The valve 512 has lands *a* and *c* at opposite ends which are slidably mounted in the bores 513 and 514. With the valve in the neutral position as illustrated, the land *a* closes the pump inlet port 519 and the land *c* closes the pump inlet port 521. A port 522 which is connected to the reverse clutch servo is located near the inner end of the bore 513. The triangularly shaped reverse clutch cooling port 523 is located in the large bore 515 as clearly shown in FIG. 6. The annular port 526 located at the central end of the valve bore 514 is connected to the forward clutch servo. The forward clutch cooling passage is connected to the triangular port 527 located at the left hand end of the large diameter valve bore 515. The valve member 512 also has a central piston 531 mounted on the land *b* and retained in position by split rings 532 located at each side of the piston 531. A detent mechanism for resiliently holding the valve in forward, neutral or reverse is provided by the balls 533 and spring 536 located in bores 534 in the valve housing 516 and a series of three annular detent grooves 537 in the valve member 512 between the lands *b* and *c*. The grooves 537 are positioned to correspond to the three valve positions forward, neutral and reverse. The springs 536 resiliently urge the balls 533 in the grooves to resiliently retain the valve in neutral or forward or reverse position.

The three ratio transmission located in housing portion 14 is controlled by a manual selector valve 176 having a valve member 177 located in a suitable bore 178 in body 175. The valve 177 has a land *a* adjacent the controlled end and a land *b* at the other end and an intermediate portion of reduced diameter. The land *b* has adjacent its central portion three annular detent grooves which cooperate with the ball 179 which is resiliently urged into the grooves to provide a three position detent. The main line 134 is connected to the valve bore 178 at port 181. The valve 177 has a central passage 182 extending from the space between the lands *a* and *b* to the far end of land *b*. The passage 182 has suitable apertures in the reduced portion of valve 177 to receive fluid supplied by port 181 from main line 134. Passage 182 is closed at the end of land *b* by a suitable plug and has a connecting port portion 183 located in the surface of land *b* adjacent the end and beyond the detent recesses. The valve 177 is movable by a handle 184 connected to the valve by means of a linkage to move the port 183 into alignment with the port for line 93 to actuate the high clutch or to the port for line 101 to actuate the intermediate clutch or to the port for line 111 to actuate the low clutch.

The push start and scavenging selector valve 190 is located in a bore 191 and actuated through a suitable linkage by a hand control lever 192. The valve 190 is in the scavenging position as illustrated in FIG. 1. The valve 190 has lands $a$, $b$, $c$ and $d$, with land $a$ being adjacent the operating linkage or handle 192. The gear sump 193 for the final drive or other transmission gearing has a sump scavenging line 194 connected to the valve bore 191 between the lands $c$ and $d$ but adjacent land $d$ of valve 190. The push start and scavenging pump 195 has an intake line 196 connected to the valve between the lands $c$ and $d$ adjacent land $c$. The outlet 197 is connected to the valve between the lands $a$ and $d$ adjacent land $b$. The main feed line 198 is connected to the valve bore 191 between the lands $a$ and $b$ opposite the pump outlet line 197. The line 198 is connected to the main line through a check valve 199. The transmission sump inlet line 201 is connected to the valve bore 191 between the lands $a$ and $b$ adjacent the land $a$. A transfer line 202 connects the space between the lands $a$ and $b$ opposite line 201 to the space between the lands $b$ and $c$.

A modified transmission of this type is illustrated in FIG. 2. The transmission housing 231 has a rear portion 232 for the transmission gearing and a forward portion 233 for the torque converter divided by partition 234. The engine or converter input shaft 235 is rotatably mounted by a sliding bearing 236 in housing 233 and drives the converter housing 236. The impeller blades 237 are fixed to the rear portion of the converter housing 236. The converter housing 236 also has a radially inwardly extending portion 238 which is rotatably mounted by suitable thrust bearing 239 on a fixed or ground sleeve portion 240 of the transmission housing 231. A gear 243 on portion 238 may be employed to drive the transmission pump and suitable accessories or power take-off devices mounted on the transmission housing 233. The converter turbine blades 245 are mounted on a supporting disk 246 which is secured to the converter output shaft 247. The converter output shaft has a forward pilot bearing 248 which fits into a bore 249 at the rear end of the engine shaft 235. A first stator 250 is connected by a one-way clutch 251 to the ground sleeve 240 and a second stator 252 is also connected by a one-way clutch 253 to the ground sleeve 240.

The converter output shaft 247 is rotatably mounted and axially located by the thrust bearing 256 located in the partition 234 between the converter housing 233 and the gearing housing 232. Adjacent bearing 256, a sun gear 257 secured to the shaft 247 provides the input drive for the transmission gearing. The transmission casing 232 has a central partition 260 which divides the housing's forward and reverse gearing portion from the three ratio gearing portion and provides a mounting for thrust bearing 261 which supports the forward and reverse gear output sleeve shaft 262. A pilot thrust bearing 267 located between the internal bore of intermediate shaft 262 and a pilot extension on converter output shaft 247 supports the forward end of the intermediate shaft. The forward carrier 263 mounted on the sleeve shaft 262 carries the planetary pinions 265 which mesh with the sun gear 257 and the ring gear 266. The ring gear 266 is connected to ground to effect a forward drive by the multiple plate ground clutch 268 which has alternate plates connected to the ring gear 266 and intermediate plates connected to the housing 232. The plates are engaged at one end by a fixed abutment 269 and at the other end by an annular surface on the piston of servo motor 271 which is supplied with fluid under pressure by the line 272. The clutch cooling fluid is supplied through the line 273.

The reverse drive carrier 276 is also mounted on the forward and reverse output sleeve shaft 262 and carries a plurality of planetary pinions 277 which mesh with sun gear 278 which is connected by an annular disk 281 with the forward ring gear 266 and with the reverse ring gear 282. The reverse ring gear 282 is braked by a multiple plate clutch 283 having alternate plates attached to the ring gear 282 and intermediate plates attached to the housing 232. One end of the multiple plate clutch 283 engages the fixed abutment 269 on the housing and the other end is actuated by the annular face of the piston of servo motor 284 which is supplied by fluid under pressure by the line 285. The cooling fluid of the multiple plate clutch 283 is supplied by the line 286. The cooling fluid lines 273 and 286 may terminate in an annular port to distribute the fluid circumferentially. Referring to FIG. 2 it will be seen that the partitions 234 and 260 have portions adjacent the outlets of the cooling fluid passages 273 and 286 respectively to axially locate the ring gears. The forward servo 271 and the reverse servo 284 are returned to disengage the clutches by an annular series of coil release springs 287.

The forward and reverse output shaft 262 extends into the three ratio unit and drives the carrier 289 which has planetary pinions 291 meshing with a sun gear 292 on the output shaft 293 and a ring gear 294 on the carrier assembly 295. The output side of the carrier 289 is supported by a thrust bearing 298 on the output shaft 293. The carrier assembly 295 and the ring gear 294 may be stopped by the multiple plate ground clutch 301 having plates splined to the gear 294 and the housing 232. The plates are positioned between abutment portion 302 of the housing and a piston of the annular face of the piston of servo motor 303 which is supplied by fluid by the line 304. The assembly 295 also has a carrier portion 306 having a plurality of planetary pinions 307 mounted thereon. The pinions 307 mesh with sun gear 311 mounted on the output shaft 293 and ring gear 312 which is connected to the housing by multiple plate clutch 313. Alternate plates of the clutch are connected to the ring gear 312 and the housing 232 and the stack of plates are located between the fixed abutment portion 302 of the housing and the annular face of the piston of servo motor 314 which is supplied with fluid through line 315. The servo motors 303 and 314 are disengaged by the retraction springs 316 located in an annular series between the servo motors. The ring gear 312 is connected by an extension sleeve 321 to the low clutch 322 which is connected to an annular clutch support member 323 which provides an annular cylinder 325 for the low clutch actuating piston 326. An annular plate-type release spring 327 is secured at its inner diameter to the shaft 293 by a snap ring and abuts at its outer diameter an extension portion of the piston 326.

The lubricating oil supplied through a passage 331 extending through the housing partition 234 is connected by a suitable transfer groove to the passage 332 extending through shaft 247 to the rear end. The oil then flows through passages 234 in the sleeve shaft 262 and the sun gear 278 to lubricate the reverse gearing.

The rotating torque converter housing 236 is rotatably mounted and axially fixed by thrust bearing 239 to ground sleeve 240 and rotatably and axially slidably mounted at the front end by bearing 236 in the housing 233. Shaft 247 is rotatably mounted and axially fixed by thrust bearing 248 in bore 249. The bearing 256 rotatably supports the rear end of shaft 247. Intermediate shaft 262 is rotatably mounted and axially fixed by thrust bearing 261 to the housing 232 and rotatably mounted for axial movement by pilot bearing 267 on shaft 247. Ring gears 266 and 282 are centered on the pinions and axially located by the adjacent projections on housing walls 234 and 260. Sun gear 278 is axially located between carriers 263 and 276. Output shaft 293 is rotatably mounted and axially fixed by thrust bearing 290 to housing 232 and rotatably mounted by bearing 298 on carrier portion 289 of intermediate shaft 262. As in FIG. 1, ring gears 294 and 312 are centered on the pinions. Gear 294 is axially located by a projection on partition 260 and abutment 302 and gear 312 is axially located by abutment 302 and a flange of carrier 306.

The torque converter output shaft 247 has at its rear end an internally splined bore 337 into which may be inserted the splined end of the torque converter power take-off shaft 338 partially shown in dot and dash lines. This shaft 338 may be easily replaced in the field by the forward and reverse gear power take-off shaft 341 which is suitably splined at the end to engage the internal spline 342 in the central portion of the forward and reverse gear output sleeve shaft 262. Both of the shafts 338 and 341 extend out beyond the final drive shaft 293 where they are mounted in a bearing and drive a power take-off device. Thus two power take-off drives are provided; shaft 338 is driven directly by the torque converter and shaft 341 by the torque converter and the forward and reverse reduction gearing to provide direction of rotation desired.

The power take-off mechanism which provides two power take-off shafts 341 and 338 which may be alternatively attached to the transmission drive as explained above, may be modified as illustrated in FIG. 3 to provide power take-off shafts 338' and 341' which may be permanently assembled in the transmission. Since the transmission illustrated in FIG. 3 is substantially the same as the transmission illustrated in FIG. 2, only the elements substantially directly associated with the power take-off shafts are illustrated. The torque converter output shaft 247' is rotatably mounted in the transmission housing partition 234' and carries the sun gear 257' which meshes with the planetary pinions 265' of the forward planetary gear set as in the transmission illustrated in FIG. 2. The converter output shaft 247' has a splined connection 337' with the central power take-off shaft 338'. The intermediate output shaft 262' has attached thereto the driven carrier 276' of the reverse planetary gear set and is rotatably mounted in a bearing 261' in the central partition 260' of the transmission housing. The output shaft 262' drives the input carrier 289' of the three speed transmission which functions in the same manner as explained above in connection with FIG. 2. The transmission drive is similarly transmitted to the final output shaft 293'. A power take-off sleeve shaft 341' is located between the central power take-off shaft 338' and the transmission output shaft 293', and is connected by the spline connection 342' to the intermediate output sleeve shaft 262'. The transmission output shaft 293' will extend beyond the rear wall of the transmission housing and drive a transmission output gear. The intermediate power take-off shaft 341' extends beyond the shaft 293' and drives a power take-off gear or other suitable power take-off mechanism. The central shaft 338' extends beyond the intermediate power take-off shaft 341' and drives a suitable power take-off drive gear or other power take-off mechanism. These power take-off shafts may be used at the same time or independently.

The six ratio transmission illustrated in FIG. 4 is mounted in a housing 350 which has the torque converter portion 352 having a forward wall 351 separated by a partition 353 from the forward and reverse gear portion 354. The forward and reverse gear portion 354 is separated by a partition 355 from the three-ratio portion 356 having a rear wall 357. The two-ratio gear housing 358, which has the forward wall 359 and a rear wall 360, is secured to the partition 357. The engine or converter input shaft 361 is rotatably mounted in bearing 362 in the forward wall 351 of the transmission housing 350 and is suitably connected by a flexible disk 363 to the converter housing 364 which carries the impeller blades 365. The free-end 366 of the converter housing 364 is mounted by suitable thrust bearing 367 on the ground sleeve 368 which is part of the housing partition 353. The gear 371 may also be affixed to the end 366 of converter housing 364 to provide a drive for the transmission pumps, accessories or power take-off devices. The turbine blades 376 are suitably mounted on a support 377 which is secured to the converter output shaft 378. The first stator 381 and the second stator 382 are suitably mounted by means of one-way clutches 383 on the ground sleeve 368. The outer races 384 of the one-way clutches 383 fit into an internal bore in the stators and are non-rotatably secured by rivets 385 which fit in a hole drilled half in the stator and half in the outer race 384 and axially secured by the annular rings 386 located on both sides of each stator and secured in place by the rivets 385.

The torque converter output shaft 378 is suitably mounted in the thrust bearing 379 on the converter housing and bearing 387 in the partition 353 and drives the sun gear 388 of the forward planetary gear set. The forward planetary gear set consists of a plurality of pinions 389 meshing with the sun gear 388 and a ring gear 391. The ring gear 391 is braked by a multiple plate clutch 396 which is actuated by a servo motor 397 supplied with fluid through the line 398. The planetary pinions 389 are mounted on a carrier 399 which is fixed to the forward and reverse output sleeve shaft 401 mounted in thrust bearing 402 located in partition 355.

The reverse drive carrier 407 is also fixed in the output shaft 401. Planetary pinions 408 mounted on the reverse carrier 407 mesh with the sun gear 409 which is connected by disk 411 with the ring gear 391 and also mesh with the ring gear 412. The reverse ring gear 412 is suitably connected to ground by a multiple plate clutch 416 which is actuated by the servo motor 417 which is supplied with fluid through the line 418. An annular series of common release springs 419 constantly urges both the forward and reverse servo motor pistons toward their release positions.

The forward and reverse output shaft 401 drives the carrier 426 which is the input member of a three-speed gear unit. Planetary pinions 427 are mounted on the carrier 426 and mesh with sun gear 428 on the intermediate output shaft 429 and with ring gear 431 on the rotor assembly 432. The rotor assembly and ring gear 431 may be stopped by the multiple plate clutch 438 which is actuated by the servo motor 439 which is supplied with fluid by line 440. The rotor assembly 432 also has a carrier 441 for the planetary pinions 442 which mesh with another sun gear 443 on the intermediate output shaft 429 and also mesh with ring gear 444. The ring gear 444 may be stopped by a multiple plate clutch 451 which is actuated by servo motor 452 which is supplied with fluid from the line 453. The springs 454 release both clutches 439 and 451.

Low drive is effective through clutch 456 which connects the ring gear 444 with the low drive support 457 which is secured to the intermediate output shaft 429. The servo motor 458 rotating with output shaft 429 is located in the low drive support 457 and actuates clutch 456. The Belleville reaction spring 459 urges the piston of servo motor 458 toward the clutch disengaged position and fluid from line 460 engages the clutch. The intermediate output shaft 429 has a sun gear 466 located in the two-ratio unit housing 358. Sun gear 466 meshes with pinions 467 mounted on a carrier 468 connected in driving relation to the final output shaft 469. The intermediate output shaft 429 has a pilot bearing extension 471 extending into the bore in the end of final output shaft 469. The planetary pinions 467 also mesh with ring gear 474 which may be connected to ground by the ground clutch 476, which is actuated by servo motor 477. The servo motor 477 is actuated to engage the clutch by fluid from supply line 478. The clutch is disengaged by release of the fluid and the action of springs 479. The direct drive connection is supplied by the driving disk 481 which is fixed to the intermediate shaft 429 and may be connected by the clutch 482 to the ring gear 474. The clutch is located between the fixed abutment portion of the support 481 and a piston of a servo motor 483. The piston engages the clutch plates to apply the clutch for direct drive when fluid is supplied under pressure by line 484. A pair of reversely positioned annular springs 485 return the piston of servo motor 483 to the clutch disengaged position. It will be noted that the springs 485 consist of an annular spring engaging the servo motor piston and a second annular spring having a smaller differential diameter coned in the reverse direction engaging the first annular spring and anchored at its inner diameter to the intermediate drive shaft 429 by a split ring.

The converter 352, the forward and reverse gearing unit 354, and the three speed gear unit 356 of the six speed transmission shown in FIG. 4, are similar and have the same type of bearing mounting as the three speed transmission 231 described above. The added two speed unit 358 has a final drive shaft 469 rotatably mounted and axially fixed by thrust bearing 470 and rotatably supported by pilot bearing 471. Ring gear 474 is axially located between flanges of carrier 468.

Figure 7:
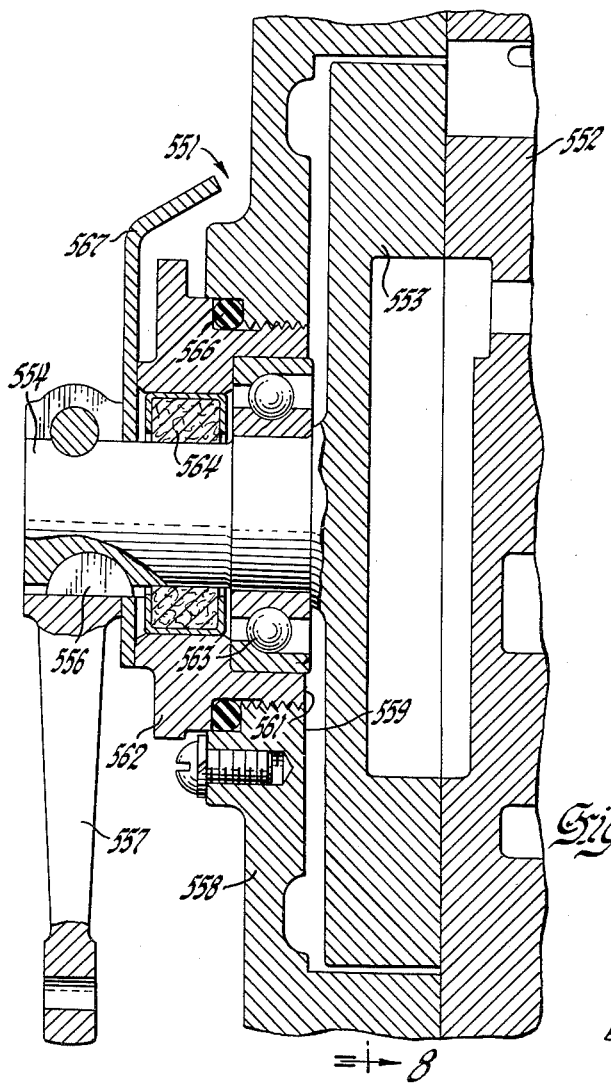
FIG. 7 is a section of a rotary control valve.

The control mechanism for the six-ratio transmission 351 illustrated in FIG. 4 is similar to the control illustrated in FIG. 1 with the exception that the six position valve 551 illustrated in FIG. 7 is substituted for the three position shift valve 177. The rotary valve 551 has a fixed plate 552 and a rotary valve member 553. The rotary valve member 553 has a flat lapped surface engaging the plate 552 to provide a seal around the ports in the valve member and plate. Suitable ports in the engaging faces of these members provide the proper control connections as will be explained below in connection with FIG. 8. The rotary valve member 553 is integrally connected to a shaft 554 which is suitably secured by a key 556 to the operating lever 557. The rotary valve member is held in position in contact with the fixed plate member 552 by means of a housing 558 having an annular cavity 559 providing a space for the valve member 553. The housing 558 also has a central opening 561 for the adjustable seat 562 which supports the thrust bearing 563 that rotatably holds the valve member 553 in firm contact with the fixed plate 552. Adjustable member 562 also carries a seal 564 to prevent leakage from the valve cavity 559. A seal 566 may also be provided between the adjustable member 562 and the housing 558 to seal the threaded connection between these members. A pointer 567 may also be attached to the control shaft 554 to indicate the ratio setting of the valve.

The neutral stop pin 571 and the sixth ratio stop pin 572 are fixed in the plate 552 and project into a recess 573 extending about a portion of the periphery of the movable valve member 553. Immediately above the recess 573, the member 553 has a series of indentations 574 shown in dot and dash lines at the right in FIG. 8 and labeled "N" and 1 through 6 inclusive. When the ball detent 575 is resiliently urged into engagement with the recesses "N" by a spring 576, the transmission is in neutral, and when the ball is in the other recesses 1 through 6 inclusive, the transmission is in the corresponding transmission speed ratios. The fluid supply from the main pumps which is controlled by the pressure regulator valve is supplied to three ports 581, 582, 583. These ports are located symmetrically and equally spaced about the perimeter of the valve plate 552 and two of these ports 581 and 582 are located at opposite ends of the recess 573 when the valve is in the neutral position. A port 586 located radially inwardly of the inlet port 581 is connected to the low clutch C3 such as clutch 456 in FIG. 4. The port 587 located radially outside of the inlet port 581 is connected to the intermediate clutch C5 such as clutch 451 in FIG. 4. The port 588 is located radially inwardly of the inlet port 582 and is connected to the high clutch C4 such as clutch 438 in FIG. 4. The port 591 located radially outwardly of the inlet port 583 is connected to underdrive clutch C6 such as clutch 476 in FIG. 4 while the port 592 located radially inwardly of the inlet port 583 is connected to the direct drive clutch C7 such as clutch 482 in FIG. 4. A plurality of relief channels 593 are located on each side of the ports in each of the three groups. Each of these relief or drain channels is connected to the central chamber 594 which drains through one of the channels 593 to the outlet 595. The valve may be rotated to the positions indicated to connect fluid under pressure to the clutches marked "X" in the table below.

|   | C3 | C4 | C5 | C6 | C7 |
|---|----|----|----|----|----|
| N |    |    |    |    |    |
| 1 |    |    | X  |    | X  |
| 2 |    | X  |    |    | X  |
| 3 |    |    | X  | X  |    |
| 4 | X  |    |    |    | X  |
| 5 |    | X  |    | X  |    |
| 6 | X  |    |    | X  |    |

Figure 8:
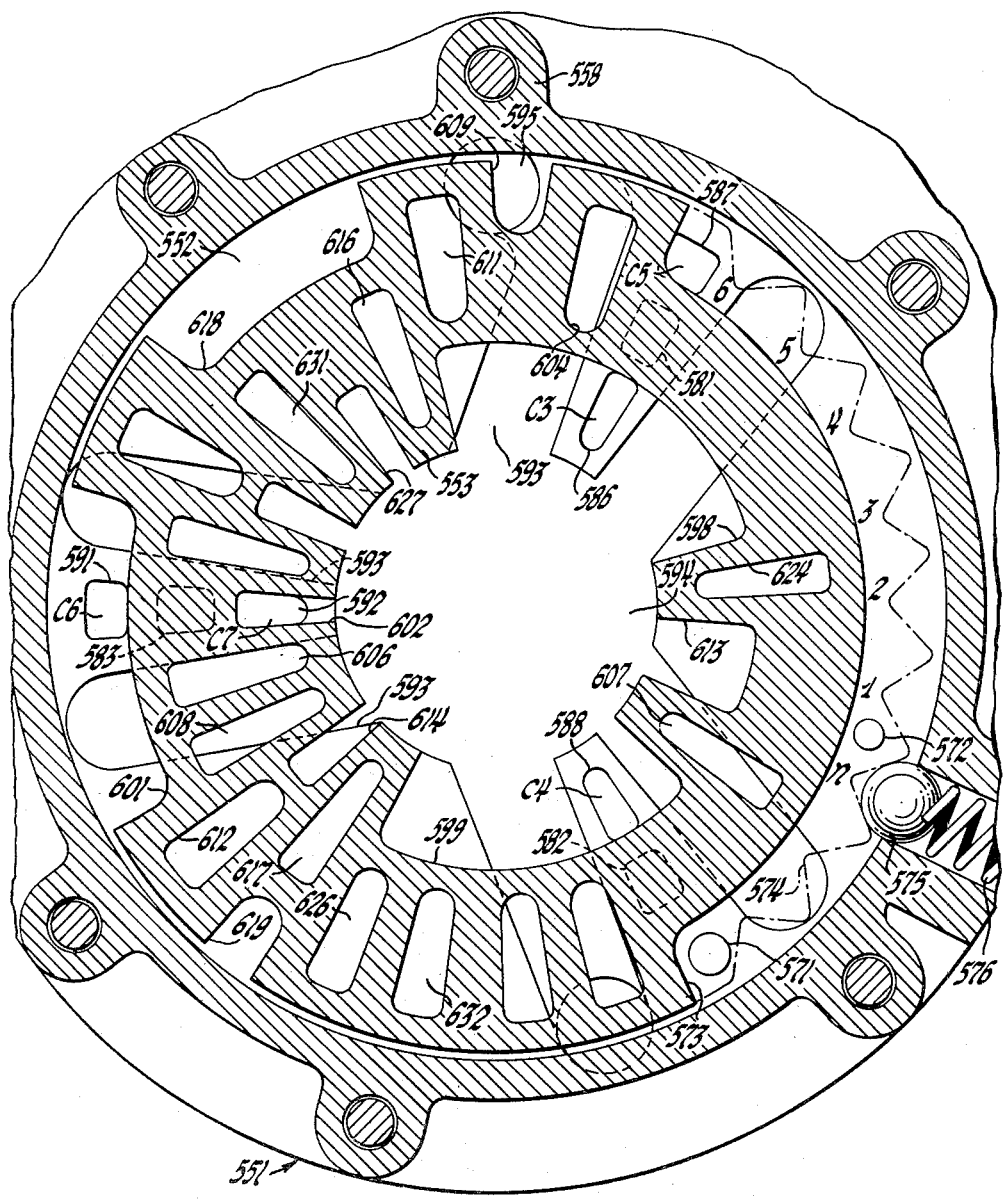
FIG. 8 is a section of a rotary selector valve on the line 8—8 of FIG. 7.

With the rotary valve member 553 in the neutral position illustrated in FIG. 8 it will be seen that the inlet ports 581 and 582 and 583 are closed and that each of the clutch ports is connected to exhaust. Port 586 is exhausted via recess 598, port 587 via recess 573, port 588 via recess 599, port 591 via recess 601, and port 592 via recess 602. When the valve is shifted to the first speed ratio position so that the detent of the ball 575 fits the No. 1 recess and is in the first speed ratio position, the inlet port 581 is connected by transfer port 604 to port 587 to supply clutch C5 and inlet port 583 is connected by transfer port 606 to port 592 to supply clutch C7 while inlet port 582 is closed. The ports 586, 588, 591 are respectively vented by recesses 598 and 599 and 601. In the second speed ratio position, inlet port 582 is connected by the transfer port 607 to port 588 to supply clutch C4 and inlet port 583 is connected by transfer port 608 to supply port 592 and clutch C7 while inlet port 581 is blocked. In the second speed ratio position, the ports 586, 587, and 591 are vented respectively by recesses 598, 609 and 601. The third speed ratio position, the inlet port 581 is connected by transfer port 611 to the port 587 for clutch C5 and inlet port 583 is connected by transfer port 612 to port 591 for clutch C6 while inlet port 582 is closed. Ports 586, 588 and 592 are respectively vented by recess 598, 613 and 614. When the valve is in the fourth speed ratio position the inlet port 581 is connected by transfer port 616 to port 586 for clutch C3 and the inlet port 583 is connected by transfer port 617 to port 592 for clutch C7 while inlet port 582 is closed. The ports 587, 588 and 591 are in fifth ratio respectively exhausted by recess 618, 613 and 619. When the valve is in the fifth speed ratio position, inlet port 582 is connected by the transfer port 624 to the port 588 for clutch C4 and the inlet port 583 is connected by the transfer port 626 to the port 591 for clutch C6 while inlet port 581 is closed. The other ports 586, 587 and 592 are respectively vented by recesses 627, 618 and 599. In the sixth speed ratio position inlet port 581 is connected by the transfer port 631 to the port 586 for clutch C3 and the inlet port 583 is connected by transfer port 632 to the port 591 for the clutch C6 while inlet port 582 is closed. Ports 587, 588, and 592 are exhausted respectively via recesses 618, 598 and 599.

*Operation*

The engine (not shown) drives the converter input shaft 11 and the rotatable housing 18 of the torque converter 12 illustrated in FIG. 1. The torque converter pump vanes 19 rotate with the housing 18 and transmit energy to the fluid to hydro-dynamically drive the turbine vanes 20 which are connected by a turbine runner to the converter output shaft 21. A sun gear 36 mounted on the converter output shaft 21 is the driving member of the forward and reverse compound planetary gear set in housing 13. The forward reduction drive is effected by engaging the forward clutch 55 to stop the reaction ring gear 46. The sun gear 36 then drives the planetary pinions 38 which react against the ring gear 46 so that the pinions and the carrier 39 on which they are mounted drive the intermediate transmission shaft 41 providing the forward reduction drive. The reverse drive is provided by engaging the clutch 58 which stops the reaction ring gear 48. Since the ring gear 48 meshes with planetary pinions 47 which in turn mesh with planetary pinions 38 which in turn mesh with sun gear 36, the drive from the sun gear 36 forces the dual planetary pinion assembly 38, 47 and its carrier 39 to rotate the intermediate transmission shaft 41 in the reverse direction and at a reduced speed.

The intermediate transmission shaft 41 provides the input for the three ratio compound planetary gear in housing 14 and drives an input carrier 78 mounted on the planetary pinions 79 of the high planetary gear set. The high planetary gear set has a driven sun gear 80 on the output shaft 15 and a reaction ring gear 81 which may be stopped by the high clutch 91. When the high clutch 91 holds the ring gear 81, the intermediate transmission shaft 41 drives, through the carrier and pinions of the high planetary gear set, the output shaft 15 in overdrive.

In the intermediate ratio, a compound planetary gear set consisting of the above described high ratio planetary gear set and a second planetary gear set consisting of pinions 83 mounted on a carrier element 93 connected to the ring gear 81, a sun gear 84 constituting a driven member fixed on the output shaft 15, and a ring gear 85 constituting the reaction member. When the intermediate clutch 99 is engaged to stop the intermediate reaction ring gear 85, the drive from the intermediate transmission shaft 41, drives the planetary pinions 79 of the high planetary gear set. This drive rotates the ring gear 81 and the planetary pinions 83 at a reduced speed compared to the speed of the input carrier 78 and thus the final output shaft 15 is rotated by the sun gear 84 at an intermediate overdrive speed.

To provide low speed ratio, the clutch 104 is engaged which through the clutch support 106 connects the ring gear 85 to the output shaft 15. Since the ring gear 85 and the driven sun gear 84 are both fixed to the output shaft 15, the carrier 82 is fixed. The carrier 82 in turn fixes the ring gear 81 to the output shaft 15. Thus the compound planetary gear set is locked up and provides a direct drive connection between the intermediate transmission shaft 41 and the final drive shaft 15.

This combination of gearing including a reduction forward and reverse gear and the three speed ratio gear having one-to-one direct drive and two overdrive ratios provide the most economical use of gearing. In the low ratio where the gearing must have the maximum torque capacity, the three ratio compound planetary gear unit is in one-to-one ratio or locked up so that all the elements transmit torque. In the intermediate ratio where the torque load on the gearing is less than in low ratio but greater than in high ratio, the torque load is transmitted by both planetary gear sets including the pinions 79 and 83. Then in high ratio, the lightest torque loads are transmitted through the single planetary gear set having the pinions 79. The low torque requirements of the high ratio are transmitted by the high planetary gear set having pinions 79. The medium torque requirements of the intermediate ratio are transmitted by the high and intermediate gear sets by pinions 79 and pinions 83 so that intermediate pinions 83 need only transmit the additional torque required in intermediate ratio. The maximum torque requirements of low ratio are transmitted by the low and intermediate gear sets and the high clutch 104, which in locked up or direct drive condition can transmit more torque. It will also be noted that the forward, reverse, high and intermediate clutches have substantially the same capacity requirements and thus may be made the same size. Only for the reverse clutch is an additional plate used. Thus the clutch plates and servos may be the same size.

The hydraulic control system for actuating the transmission is supplied with fluid from the transmission sump 127. The pump 130 evacuates the oil from the sump through the strainer 128 and delivers it through the filter 133 which is provided with suitable by-pass 135 to the main line 134. Main line 134 is connected to the port 138 at one end of the main line pressure regulator valve bore 140 to act on the end of valve member 139 and urge it to compress the spring 141 located in the other end of bore 140. The first increment of movement will connect the main line 134 through the port 138 to the converter feed line port 142. Further movement will align port 144 in the side wall valve 139 to permit fluid to flow from the pump outlet through line 132 through port 144 and the bore in valve member 139 to the exhaust port 145 to relieve the pressure in the main line 134. The converter feed line 143 delivers oil at a reduced pressure to the converter between the pump 19 and the stator 23. The fluid leaves the converter between turbine 20 and the stator 22 via line 147 which is connected through the cooler 148 to the lubrication system line 115. The lubrication system is provided with suitable relief valve 149 to maintain a proper pressure level in the lubrication system.

The forward and reverse control valve 154 controls the supply of fluid to the forward servo motor 56 and the reverse servo motor 59 to actuate the forward and reverse planetary gear set. The main line 134 supplies fluid to the valve ports 165 and 171 which are covered by valve stands *d* and *e* respectively when the valve is in the neutral position illustrated in FIG. 1. When the valve is moved toward the forward position, the inlet port 165 is uncovered permitting the fluid under pressure to flow through port 164 and lines 65 to the forward servo 56 and through port 158 to the forward clutch lubricating and cooling passage 69. During the initial movement of the valve, the inlet port 165 is opened wide and since the port 158 and line 69 for the clutch cooling oil is larger, a large volume of cooling oil is transmitted to the clutch. Due to the large flow of cooling oil, the pressure in the servo supply line 65 does not build up rapidly. As the valve 156 is moved further toward the forward position, the land *a* gradually closes the elongated slot-shaped port 158 and gradually decreases the flow to the cooling line 69 and thus diverts the flow to the servo line 65 and gradually builds up the pressure in the servo 56. While the valve 156 is being moved from the neutral to the forward position, the fluid in large diameter bore 157 and bore 163 between lands *b* and *a* acts upon the larger area of the land *a* to urge the valve toward the neutral position. Thus the fluid force acting through line 65 upon the forward servo motor 56 also acts upon the valve and may be felt by the operator at the handle 172. Thus the operator may feel when he moves the handle 172 a force proportional to the force acting on servo motor 56 to engage the forward clutch 55. When the land *a* fully closes port 158 the cooling oil flow is completely stopped and the full line pressure is applied via line 65 to the forward servo 56. Substantially at the same time that the cooling port 158 is closed, the land *b* enters the bore 163 to stop flow from the inlet port 165 and bore 163 to the large diameter bore 157 where it would act upon the land *a*. Since the pressure in line 65 now acts upon balanced lands *d* and *b*, the valve is at rest or balanced in the forward position without any force tending to return it to the neutral position.

Movement of the valve 156 from the neutral position to the reverse position permits flow of the fluid from the main line 134 and port 171 through port 170 to the reverse servo line 66 and through the port 159 to the reverse clutch cooling line 72. Continued movement reduces the cooling oil flow and increases the pressure in the clutch servo 59. The final movement closes the cooling oil passage and simultaneously, or shortly before or after, closes bore 169 when land c enters bore 169 to block the flow of oil from the inlet port 171 to the land a which had tended to return the valve to the neutral position. During movement from the neutral position to the reverse position, the fluid pressure in line 66 acting on the reverse servo 59 also acts upon the unbalanced area of land a and tends to return the valve to the neutral position. Thus the operator feels when grasping handle 172 a force proportional to the clutch engaging force of reverse servo 59.

There is a clearance of approximately .005 inch between the land a and the bore 157 so that after the valve has reached the forward position or the reverse position, and either the lands b or c block the flow of oil to act on the unbalanced area of the land a, that the oil which is then entrapped against the face of land a and the end portion of the bore 157 will be vented through the .005 inch clearance past the land a and through the other cooling line to the sump. This permits the valve 156 to be fully at rest or balanced in the forward or reverse position. In a forward shift for example, when the land b has closed bore 163 and the land a has closed port 158 there is a body of fluid trapped between the end of bore 157 and land a provides a dashpot action and slows further movement of the valve but permits slow movement as the fluid escapes through the .005 inch clearance between land a and bore 157. A similar dash pot action occurs during a reverse shift.

Figure 6:
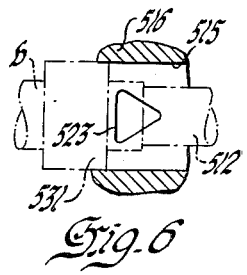
FIG. 6 shows a detail of the control valve of FIG. 5.

The modified forward and reverse valve illustrated in FIGS. 5 and 6, functions in a manner similar to that described above in connection with valve 154 illustrated in FIG. 1 but has a detent and directly proportional feel. Thus when this valve is moved from neutral toward the forward position, the detent ball 533 resists the initial movement, then the main line port 521 is opened to the small bore 514 and the large bore 515 where the main line pressure flows through the port 526 to the forward clutch servo and through the port 527 to the forward clutch cooling line. During this phase of the operation, the fluid and pressure in the forward servo motor also acts in the space between the land c and piston 531. Since the piston 531 is larger, there is an unbalanced force tending to return the valve toward the neutral position. As the large land 531 moves toward the forward position, it gradually closes port 527. The port 527, illustrated in FIG. 6, has a triangular shape with rounded apexes. Piston 531 first covers the wide base portion and thus during the initial increment of movement closes a large portion of the area of passage 527. Further increments of movement close lesser portions of the area of the port 527 until the port is completely closed. Before the port is completely closed, land b enters bore 514 and blocks the flow from the inlet port 521 to the large bore 515. During the short interval that port 527 is opened, after land b enters bore 514, the fluid acting on the unbalanced area of land 531 is relieved through port 527. Thereafter when the land b is in bore 514 and port 527 is closed, a clearance of .005 inch between the piston 531 and the bore 515 permits the fluid trapped between the land b and the piston 531 and the bore 515 to escape. Thus the main line pressure 521 is blocked from entering bore 515 and acting on piston 531 and the fluid that was acting on piston 531 is relieved through the clearance. The force tending to return the valve to the neutral position is relieved and the valve will come to rest with the detent ball 533 resting in the right hand groove 537 to hold the valve in the forward position against shock or accidental displacement.

During disengagement of the forward clutch, the valve 512 is moved from the detent forward position toward neutral. After the detent ball 533 is dislodged from the groove, the piston or land 531 uncovers port 527 and then land b moves out of bore 514 to permit main line pressure from port 521 and the forward clutch servo pressure from port 526 to be connected via bores 514 and 515 to port 527 to cool the clutch and act on the unbalanced area of piston 531. The diversion of main line pressure to the cooling line, reduces the pressure in bores 513 and 515, and thus the unbalanced pressure force on piston 531 and the pressure force acting on forward servo motor at the same time. Thus as the valve moves toward neutral the pressure on the servo motor gradually decreases and when the valve reaches the neutral detent position, the main line port 521 is closed.

The reverse shift is made in the same manner, the valve on leaving the neutral detent position opens main line port 519 to the space between land a and piston 531 to supply port 522 for the reverse servo and port 523 for reverse servo cooling. As best shown in FIG. 6, the piston 531 enclosing port 523 first closes or covers a large area at the base of the triangular port. Thereafter the same linear increment of movement of the valve closes a reduced area. This construction provides a straight line pressure increase in the servo motor proportional to the linear movement of the valve. Then land b blocks bore 513 to eliminate the unbalanced force and when port 523 is closed there is a hydraulic stop or dashpot effect due to fluid trapped in bore 515 which is quickly relieved by the clearance around the piston 531 as the valve rests in reverse detent position and is hydraulically balanced.

The three speed planetary unit of FIG. 1 is controlled by the selector valve 176 which directs the fluid from the main line via port 181 to either the high clutch servo line 93, the intermediate clutch servo line 101 or the low clutch servo line 111 to effect high, intermediate and low ranges respectively.

The push start and scavenge pump control valve 190 is illustrated in FIG. 1 in the scavenging position (S) where pump 195 draws oil from the gear sump 193 through line 194 and between lands c and d of valve 190 and through line 196 to the pump 195. Fluid is then discharged via line 197 and between the lands a and b of valve 190 to the line 201 which delivers the oil to the main transmission sump 127. Though the line 198 is opened through the check valve 199 to the main pressure line 134, the fluid does not flow through this line since the high pressure in the main line 134 holds check valve 199 closed against the low pressure in lines 201 and 198. This pressure in lines 198 and 201 is low because the fluid flows freely into the transmission sump 127. If a push start is desired, the valve 190 is moved by the control 192 to the push start position (PS) then the transmission sump 127 is connected via the line 201 across the valve 190 between the lands a and b to line 202 and then between lands c and d to the line 196 to the pump inlet 195. Then the pump 195 delivers the oil through outlet 197 and between the lands b and c to the line 198 which delivers the oil through the one-way check valve 199 to the main line 134. Thus when the vehicle is pushed and the valve 190 is in the push start position, the pump 195 driven by the rear wheels of the vehicle will supply oil from the transmission sump directly to the main line through check valve 199.

In the modified form of the transmission illustrated in FIG. 2, the converter input shaft 235 again drives the rotary converter housing 236 and the converter pump 237. The power is transmitted hydraulically to the turbine 245 of the converter which is mounted on the converter output shaft 247. The sun gear 257 of the forward and reverse planetary gear set is mounted on the converter output shaft 247. The driven intermediate shaft 262 carries the driven carrier and planetary pinions 265 which mesh with the driving sun gear and the reaction ring gear 266. When the forward clutch 268 is actuated to stop the reaction ring gear 266, the converter output shaft 247 drives the intermediate shaft 262 at a reduced forward speed.

For reverse drive, a compound planetary gear arrangement is employed having the same input sun gear 257 and output planetary pinions 265 mounted on carrier 263 fixed to the intermediate output shaft 262 and planetary pinions 277 mounted on carrier 276 fixed to the intermediate output shaft 262. In reverse the ring gear 266 of the forward planetary gear set is free and is connected to drive the sun gear 278 to the reverse planetary gear set. Thus when the ring gear 282 is held by clutch 283 to drive the shaft 247, the converter output torque is transmitted by shaft 247 and sun gear 257 to the compound planetary gear unit to reversely rotate intermediate shaft 262 at a reduced speed.

The intermediate shaft 262 drives the carrier 289 of the three speed ratio planetary gear set which is of the type shown in FIG. 1. When the clutch 301 is engaged to lock the ring gear 294 which provides the reaction member of high speed planetary gear set, the output sun gear 292 and output shaft 293 are driven in high overdrive ratio to provide high speed. Intermediate speed is provided by engaging clutch 313 to hold reaction ring gear 312 of this compound planetary gear. Since the carrier 306 and the planetary pinions 307 are driven at a reduced speed by the high ratio planetary gear set and the intermediate shaft, the pinions react against fixed ring gear 312 and drive the sun gear 311 mounted on the output shaft 293 at intermediate speed. The low ratio is provided by clutch 322 which locks the reaction ring gear 312 to rotate with the shaft 293 and thus locks the compound planetary gear set to provide a direct drive between the intermediate shaft 262 and the final drive shaft 293.

In this transmission, the final drive shaft 293 and the intermediate drive shaft 262 are sleeve shafts. The intermediate drive shaft 262 has splines 342 provided in its internal bore to drive a splined power take-off shaft 341 from the engine through the torque converter and the forward and reverse reduction drive. Another power take-off shaft may also be inserted and connected by suitable splines 337 to the converter output shaft 247 to provide a drive through the torque converter. FIG. 3 shows a modification where the power take-off shaft 341' is also a sleeve shaft so that the two power take-off shafts and the one 341' connected to the forward and reverse intermediate sleeve shaft 362' and the other 338' connected to the converter output shaft 247' may be simultaneously mounted in the transmission.

The controls for the transmission 231 may be the same as shown in FIG. 1.

In another modified transmission illustrated in FIG. 4, the engine drive is connected to the torque converter input shaft 361 which drives through a flex plate 363 the pump vanes 365 on the rotary torque converter housing 364. The turbine 376 is hydrokinetically driven and drives the torque converter output shaft 378. The torque converter output shaft 378 drives the input sun gear 388 of the compound forward and reverse planetary gear set which operates similar to the forward and reverse planetary gear set illustrated in FIG. 2. When the servo motor 397 engages the clutch 396, the reaction gear 391 is stopped to provide a reduction forward drive from the input sun gear 388 through the planetary pinions 389 and carrier 399 to the intermediate output shaft 401. Reverse drive is effected by engaging clutch 416 by means of servo motor 417 which stops the reverse reaction ring gear 412. Then the reverse drive provided by sun gear 409, which is driven by the ring gear of the forward planetary gear set, reversely drives the planetary pinions 408 to reversely rotate the carrier 407 on the intermediate output shaft 401.

The intermediate output shaft 401 drives the carrier for the planetary pinions 427 of the high ratio planetary gear set of the three speed planetary transmission. The engagement of clutch 438 stops reaction ring gear 431 so that the drive is transmitted from the carrier 426 through the pinions 427 to the driven sun gear 428 on the output shaft 429. In intermediate gear the high planetary gear set drives the ring gear 431 and the carrier 441, at reduced speed. Thus when the intermediate clutch 451 is engaged to stop the intermediate reaction ring gear 444, the intermediate shaft 401 drives the final output shaft 429 at intermediate speed. Engagement of the low clutch 456 causes the ring gear 444 to rotate at the same speed as the final drive shaft 429 and locks the compound planetary gear set to provide a direct drive between the intermediate transmission 401 and the final drive shaft 429. This transmission has an additional two ratio unit so that a direct drive and an underdrive may be provided in each of the three ratios to provide a six ratio transmission. The output shaft 429 drives the sun gear 466 and when the clutch 476 is engaged to hold the ring gear 474, this sun gear drives the planetary carrier 468 and final drive shaft 469 at a reduced speed. When the clutch 482 is engaged, the ring gear 474 and sun gear 466 rotate in unison to provide a one-to-one direct drive from output shaft 429 to the final drive shaft 469.

The controls for the transmission illustrated in FIG. 4 are similar to the controls shown in FIG. 1. A forward and reverse valve, similar to valve 154 or valve 512 may be used to control the forward and reverse servo motors 397 and 417. The rotary six speed ratio control valve illustrated in FIGS. 7 and 8 is used in connection with the transmission illustrated in FIG. 4 and is substituted for the three speed reciprocating control valve 176 illustrated in FIG. 1. The transmission control valve 553 is rotated consecutively through the six speed ratio positions by means of a control arm 557 and connects the ports as explained above to actuate the clutches as indicated in the above table to effect six speeds in either forward or reverse depending on the position of the forward and reverse valve.

The claims:

1. In a device of the character described, first fluid pressure actuated motor means, second fluid pressure actuated motor means, a source of fluid under pressure, a first supply line connecting said source of fluid pressure to said first motor means, a second supply line connecting said source of fluid pressure to said second motor means, valve means in said lines having a neutral position in which both of said lines are blocked, said valve means connecting said first supply line to said first fluid pressure actuated means and continuing to block said second supply line during movement from said neutral position toward a second position, said valve having an unbalanced area, said fluid pressure actuating said first fluid pressure actuated motor means acting on said unbalanced area of said valve to resist movement of said valve toward said second position, and said valve means directing said fluid to said first line for said first fluid actuating means and blocking said fluid from said unbalanced area when the valve means is in said second position so that the valve is at rest in said second position.

2. In a power transmission, the combination of a driving element and a driven element, drive means connecting said driving and driven elements to provide a drive, friction means to effect said drive, fluid pressure actuated motor means to engage said friction means to provide said drive, a source of fluid under pressure, valve means, a supply line connecting said source of fluid pressure to said valve means, a motor line connecting said valve means to said motor means, a cooling line connected to conduct fluid from said valve means and exhaust fluid on said friction means to cool and lubricate said friction means, said valve means having a neutral position in which said supply line is blocked and said motor and cooling lines are open, said valve means connecting said supply line to said motor line for said fluid pressure actuated motor means and gradually closing said cooling line during movement from said neutral position toward a second position, said valve having an unbalanced area, said fluid pressure actuating said fluid pressure actuated motor means acting on said unbalanced area of said valve to resist movement of said valve toward said second position, said valve means directing said fluid to said motor line and said fluid actuated motor means and blocking said fluid from said unbalanced area and said cooling line when the valve is in said second position so that the valve is at rest in said second position and the flow of cooling fluid is stopped.

3. In a power transmission, the combination of a driving element and a driven element, multiple ratio drive means connecting said driving and driven elements, friction means to effect said ratios, first and second motor means operated by fluid pressure to engage first and second friction means to provide a first and a second drive ratio, a source of fluid under pressure, valve means, a first supply line connecting said source of fluid pressure to said valve means, a first motor line connecting said valve means to said first motor means, a first cooling line connected to conduct fluid from said valve means to exhaust on said first friction means, a second supply line connecting said source of fluid pressure to said valve means, a second motor line connecting said valve means to said second motor means, a second cooling line connected to conduct fluid from said valve means to exhaust on said second friction means, said valve means having a neutral position in which both of said supply lines are blocked and said motor lines and said cooling lines open, said valve means connecting said first supply line to said first motor line and continuing to block said second supply line and gradually closing said first cooling line during movement from said neutral position toward a first position, said valve having an unbalanced area, said fluid pressure actuating said first motor means acting on said unbalanced area of said valve to resist movement of said valve toward said first position, said valve means directing said fluid to said first motor line for said first motor means and blocking said fluid from said unbalanced area and said first cooling line when the valve is in said first position so that the valve is at rest in said first position and the flow of cooling fluid is stopped.

4. In a power transmission, the combination of a driving element and a driven element, a multiple ratio gear drive means connecting said driving and driven elements and having a transmission sump for fluid, fluid pressure actuated means to provide a plurality of drive ratios, a pump providing a source of fluid under pressure connected to said transmission sump, control means connecting said source to said fluid pressure actuated means and being operable to control said fluid pressure actuated means to provide said plurality of drive ratios, a second sump, a second pump continuously driven by said driven element, a check valve, and a push start and scavenge valve means connected to draw fluid from said second sump and deliver it to said transmission sump in the scavenging position and to draw the fluid from said transmission sump and deliver it through said check valve to said control means in the push start position.

5. In a vehicle, the combination of a transmission having a driving element and a driven element, a road contacting vehicle propulsion element driven by said driven element, said transmission having a variable ratio drive means connecting said driving and driven elements, fluid actuated means completing the drive and a sump, a pump connected to said sump and driven by said driving element, control means connecting said pump to said fluid actuated means to supply fluid to complete the drive, a second sump, a second pump connected to said second sump and positively connected to said propulsion element, a check valve, valve means connected to draw fluid from said second sump and deliver fluid to said transmission sump in the scavenging position and to draw fluid from said transmission sump and deliver it through said check valve to said control means in the push start position.

6. In a control mechanism, a source of fluid under pressure, a fluid actuated mechanism, valve means including a movable member connecting said source of fluid under pressure to said fluid actuated mechanism, said valve means having an unbalanced area and a vent, said valve having a closed position blocking flow from said source, said movable member of said valve on being moved from said closed position toward the open position connecting said source to said fluid actuated mechanism, to said unbalanced area and to said vent, said movable member on continued movement from said closed position to said open position gradually closing said vent to increase the pressure in said fluid actuated mechanism and on said unbalanced area and means including said movable member operative on movement from said closed to said open position to disable the force of the fluid acting on said unbalanced area.

7. In a control mechanism a source of fluid under pressure, a fluid actuated motor, a valve having a supply port, a feed port and a vent port, a supply line connecting said source to said supply port of the valve, a feed line connecting said feed port of the valve to said motor, said valve in the closed position blocking said supply port and having a space connecting said feed port and said vent port, said valve as it moves from the closed position toward the open position first opening said supply port and connecting said supply port to said feed and vent ports through said space in the valve and then gradually closing said vent port to increase the pressure in said feed port and fluid actuated motor, said valve having an unbalanced area communicating with the pressure at said feed port to resist movement of said valve toward said second position, and said valve having means blocking flow from said feed port to said unbalanced area as the valve reaches the second position to provide a dashpot.

8. In a control mechanism, a source of fluid under pressure, a fluid actuated motor, a valve having a supply port, a feed port and a vent port, a supply line connecting said source to said supply port of the valve, a feed line connecting said feed port of the valve to said motor, said valve in the closed position blocking said supply port and having a space connecting said feed port and said vent port, said valve as it moves from the closed position toward the open position first opening said supply port and connecting said supply port to said feed and vent ports through said space in the valve and then gradually closing said vent port to increase the pressure in said feed port and fluid actuated motor, said valve having an unbalanced area communicating with the pressure at said feed port to resist movement of said valve toward said second position, said valve having means trapping a small volume of fluid as the valve reaches the second position to provide a dashpot, and said valve having means to vent said last-named means to permit moving the valve to the second position.

9. In a control mechanism, a source of fluid under pressure, a fluid actuated motor, a valve having a supply port, a feed port and a vent port, a supply line connecting said source to said supply port of the valve, a feed line connecting said feed port of the valve to said motor, said valve in the closed position blocking said supply port and having a space connecting said feed port and said vent port, said valve as it moves from the closed position toward the open position first opening said supply port and connecting said supply port to said feed and vent ports through said space in the valve and then gradually closing said vent port to increase the pressure in said feed port and fluid actuated motor, said valve having an unbalanced area communicating with the pressure at said feed port to resist movement of said valve toward said second position, said valve having means blocking flow from said feed port to said unbalanced area and trapping a small volume of fluid as the valve reaches the second position to provide a dashpot, and said valve having means to vent said last-named means to permit moving the valve to the second position.

10. In a control mechanism, a source of fluid under pressure, a fluid actuated motor, a valve including an element movable on a surface having sequentially located in the path of movement of said valve element a supply port, a feed port and a triangular vent port with the apex of the triangle pointing toward the valve element in the closed position of the valve, said vent port having a substantially greater length along the path of movement of said valve element than said supply and feed ports, a supply line connecting said source to said supply port of the valve, a feed line connecting said feed port of the valve to said motor, said valve in the closed position blocking said supply port and having a space connecting said feed port and said vent port, said valve as it moves from the closed position toward the open position first opening said supply port and connecting said supply port to said feed and vent ports through said space in the valve and then gradually closing said vent port starting at the apex of said triangle to increase the pressure in said feed port and fluid actuated motor substantially directly proportional to the movement of said valve, and said valve having an unbalanced area communicating with the pressure at said feed port to resist movement of said valve toward said second position.

11. In a control for a mechanism, a source of fluid under pressure, one fluid actuated motor to control a mechanism, another fluid actuated motor to control another mechanism, a valve body having small end bores at opposite ends with a large central bore, a shoulder between said central large bore and each small end bore, said small bores having a supply port adjacent each end and a feed port adjacent each inner end near the large central bore, said large bore having a cooling port adjacent each end of said large bore and near a feed port, a supply line connecting said source to said supply ports, a feed line connecting each feed port to one of said fluid motors, a cooling line to connect each of said cooling ports to the mechanism controlled by the adjacent feed line, a movable valve member having a pair of small end lands at opposite ends fitting in said small end bores, and a central land having end portions fitting the small bores and a large central portion having a loose fit in said large bore, said central land being spaced from said small lands by a portion of reduced diameter, said small lands closing both supply ports in neutral, said valve when moved toward either apply position first opening the supply port on that side to admit fluid to the space between said small end land and said central land so the fluid acts on the unbalanced area and flows to the adjacent feed port and cooling port while the supply port on the other side remains closed, further movement of the valve in the same direction gradually closes said cooling port and increases the pressure at the feed port so that the resistance to manual movement of the valve increases with increased force on the fluid actuated motor, said small end portion of said central land entering and blocking said end bore and said large land portion closing said cooling port to prevent fluid venting through said cooling port as the valve reaches the apply position, said central land trapping fluid against said shoulder, said loose fit between said central large land and bore permitting said fluid to escape to relieve any fluid force acting on said unbalanced area.

12. In a control for a mechanism, as defined in claim 11, said portion of reduced diameter having three annular grooves, a detent member engaging said grooves to hold said valve in neutral or either apply position.

13. In a control mechanism, a source of fluid under pressure, a fluid actuated motor, valve means in a first position connecting said fluid actuated motor to exhaust and movable to a second position connecting said source to said fluid actuated motor, and said valve having feel means including an unbalanced area acted on by fluid pressure connected to said fluid actuated motor to provide a feel force proportional to the actuating force of said fluid actuated motor operative during movement of said valve from said first to said second position to resist movement of said valve toward said second position, and means rendering said feel means inoperative during a portion of said movement from said first to said second position to permit said valve element to assume a position of rest.

14. In a variable speed transmission comprising, in combination, a drive shaft; a driven shaft; forward and reverse planetary gear sets including reaction control elements, an input member common to both said forward and reverse planetary gear sets, said input member being connected to said drive shaft, and an output member for said forward and reverse gear sets; a plurality of planetary gear sets having drive sustaining elements and connected between the output member for said forward and reverse planetary gear sets and said driven shaft, said planetary gear sets adapted to coact for driving said driven shaft in a plurality of speeds both in the forward and reverse directions, a pair of brakes for selectively holding said control elements of said forward and reverse gear sets to drive said output member in a forward or reverse direction; a plurality of friction devices selectively operative to engage said drive sustaining elements for said plurality of planetary gear sets to effect speed ratio changes, and pressure fluid operated means for operating said pair of brakes, a forward and reverse selector valve for selectively controlling pressure fluid supply to said pressure fluid operated means for operating said brakes, pressure fluid operated means for operating said plurality of friction devices and a ratio selector valve for selectively controlling pressure fluid supply to said pressure fluid operated means for said friction devices.

15. A variable speed transmission comprising, in combination, a drive shaft, a driven shaft, forward and reverse planetary gear sets including reaction control elements, an input member common to both said forward and reverse gear sets connected to said drive shaft, and an output member for said forward and reverse gear sets, a plurality of planetary gear sets having drive sustaining elements and connected between the output member for said forward and reverse planetary gear sets and said driven shaft, said planetary gear sets adapted to coact for driving said driven shaft in a plurality of speeds both in forward and reverse directions, a pair of brakes for selectively holding said reaction control elements of said forward and reverse gear sets to drive said output member in a forward or reverse direction, a plurality of friction devices selectively operative to engage said drive sustaining elements of said plurality of planetary gear sets for effecting speed ratio changes, pressure fluid operated means for operating said pair of brakes, a forward and reverse selector valve for selectively controlling pressure fluid supply to said pressure fluid operated means for said brakes, pressure fluid operated means for operating said plurality of friction devices, a ratio selector valve for selectively controlling pressure fluid supply to said pressure fluid operated means for said friction devices, a source of fluid under pressure for operating said pressure fluid operated means for said brakes and said friction devices, and a pressure regulator valve for controlling the pressure of fluid supplied by said pump means.

16. In a power transmission, the combination of a driving element and a driven element, a multiple ratio drive means including friction means to establish each ratio connecting said driving and driven elements, a first fluid pressure actuated motor means providing a force proportional to the actuating pressure acting on one friction means to provide one drive ratio, a second fluid pressure actuated motor means providing a force proportional to the actuating pressure acting on another friction means to provide another drive ratio, a source of fluid under pressure, a first supply line connecting said source of fluid pressure to said first motor means, a second supply line connecting said source of fluid pressure to said second motor means, valve means in said lines having a neutral position in which both of said lines are blocked, said valve means connecting said first and second supply lines to supply actuating pressure to said first and second motor means respectively to provide said one or said other drive ratio and continuing to block said second and first supply lines respectively during movement from said neutral position in opposite directions toward a first or second position respectively, said valve having a first and a second unbalanced area, said fluid actuating pressure actuating said first and second motor means acting on said first and second unbalanced areas of said valve to resist movement of said valve toward said first and second positions respectively during engagement of said one and another ratios to indicate the degree of actuation of said friction means, and said valve means directing said fluid to said first and second supply line for said first and second motor means and blocking said fluid from said first and second unbalanced areas and venting said fluid contacting said unbalanced area when the valve means is in said first and second positions respectively so that the valve is at rest in said first and second positions when said one drive and said another drive are respectively substantially fully engaged.

17. In a power transmission, the combination of a driving element and a driven element, a multiple ratio gear drive means including friction means to each ratio connecting said driving and driven elements, a first fluid pressure actuated motor means providing a force proportional to the actuating pressure acting on one friction means to provide one drive ratio, a second fluid pressure actuated motor means providing a force proportional to the actuating pressure acting on another friction means to provide another drive ratio, a source of fluid under pressure, a first supply line connecting said source of fluid pressure to said first motor means, a second supply line connecting said source of fluid pressure to said second motor means, valve means in said lines having a neutral position in which both of said lines are blocked, said valve means connecting said first line to supply actuating pressure to said fluid pressure actuated motor means and continuing to block said second supply line during movement from said neutral position toward a second position, said valve having an unbalanced area, said fluid actuating pressure actuating said first fluid pressure actuated motor means acting on said unbalanced area of said valve to resist movement of said valve toward said second position to indicate the degree of actuation of said friction means, said valve means directing said fluid to said first supply line for said first fluid actuated motor means and blocking said fluid from said unbalanced area and having a dashpot to resist further movement when the valve means approaches said second position and said friction means is substantially engaged so that the valve is at rest in and adjacent said second position, and said dashpot permitting movement to said second position.

18. In a power transmission, the combination of a driving element and driven element, a drive means including friction means to establish a drive connecting said driving and driven elements, a fluid pressure actuated motor means providing a force proportional to the actuating pressure on said friction means to provide a drive, a source of fluid under pressure, a supply line connecting said source of fluid pressure to supply actuating pressure to said motor means, valve means in said lines having a first position in which said supply line is blocked, said valve means connecting said supply line to said motor means during movement from said first position toward a second position, said valve having an unbalanced area, said actuating pressure actuating said motor means acting on said unbalanced area of said valve to resist movement of said valve toward said second position to a degree proportional to the force acting on said friction means, and said valve means directing said fluid from said supply line to said motor means and blocking said fluid actuating pressure from said unbalanced area when said valve means is in said second position so that said valve is at rest in said second position when said friction means is substantially fully engaged.

19. In a control mechanism, a source of fluid under pressure, a fluid actuated motor, a valve having a supply port, a feed port and a vent port, a supply line connecting said source to said supply port, a feed line connecting said feed port to said motor, said valve in the closed position blocking said supply port and having passage means connecting said feed port and said vent port, said valve as it moves from the closed position toward the open position first opening said supply port and connecting said supply port to said feed and vent ports through said passage means in the valve and then gradually closing said vent port to increase the pressure in said feed line and fluid actuated motor, and said valve having feel means operative during movement of said valve from said closed to said open position to resist movement of said valve toward said open position and means rendering said feel means inoperative during a portion of said movement from said closed to said open position to permit said valve to assume a position of rest.

20. In a control mechanism, a source of fluid under pressure, a fluid actuated motor, valve means having a supply port, a feed port and a vent port, said valve means including movable means movable from a closed to an open position, a supply line connecting said source to said supply port, a feed line connecting said feed port to said motor, said valve means with said movable means in the closed position blocking said supply port and connecting said feed port and said vent port, said movable means as it moves from the closed position toward the open position first opening said supply port and connecting said supply port to said feed and vent ports and then gradually closing said vent port to increase the pressure in said feed line and fluid actuated motor, and said movable means having feel means operatively connected to said motor and operative during movement of said movable means from said closed to said open position to resist movement of said movable means toward said open position with a force proportional to the force exterted by said motor and means rendering said feel means inoperative during a portion of said movement from said closed to said open position to permit said movable means to assume a position of rest.

21. In a control mechanism, a source of fluid under pressure, a fluid actuated motor, valve means having a supply port, a feed port and a vent port, said valve means including movable means movable from a closed to an open position, a supply line connecting said source to said supply port, a feed line connecting said feed port to said motor, said valve means with said movable means in the closed position blocking said supply port and connecting said feed port and said vent port, said movable means as it moves from said closed position toward the open position first opening said supply port and connecting said supply port to said feed and vent ports and then gradually closing said vent port to increase the pressure in said feed line and fluid actuated motor, and said movable means having feel means connected to said motor and actuated by fluid pressure from said motor and operative during movement of said movable means from said closed to said open position to resist movement of said movable means toward said open position with a force proportional to said fluid pressure in said feed line and means rendering said feel means inoperative during a portion of said movement from said closed to said open position to permit said movable means to assume a position of rest.

22. In a variable speed transmission comprising, in combination, a drive shaft; a driven shaft; forward and reverse planetary gear sets including reaction control elements, an input member common to both said forward and reverse planetary gear sets, said input member being connected to said drive shaft, and an output member for said forward and reverse gear sets; a plurality of planetary gear sets having drive sustaining elements and connected between the output member for said forward and reverse planetary gear sets and said driven shaft, said planetary gear sets adapted to coact for driving said driven shaft in a plurality of speeds both in the forward and reverse directions, a pair of brakes for selectively holding said control elements of said forward and reverse gear sets to drive said output member in a forward or reverse direction, a plurality of friction devices selectively operative to engage said drive sustaining elements for said plurality of planetary gear sets to effect speed ratio changes, and operated means for operating said pair of brakes, a forward and reverse selector for selectively controlling said operated means for operating said brakes, operated means for operating said plurality of friction devices and a ratio selector for selectively controlling said operated means for said friction devices.

23. In a power transmission, the combination of a driving element, an intermediate element, and a driven element, a forward and reverse planetary reduction gear drive connecting said driving element to said intermediate element including a forward reaction gear and a reverse reaction gear, means to hold said forward reaction gear stationary, means to hold said reverse reaction gear stationary, a multiple ratio planetary gear drive connecting said driving and driven elements and including: a plurality of planetary pinions mounted in a carrier driven by said driving element, a low ratio sun gear meshing with said pinions and mounted on said driven element, a high reaction ring gear meshing with said planetary pinions, means to hold said high reaction ring gear stationary to provide high ratio, a second carrier having planetary pinions mounted thereon connected to rotate with said high reaction ring gear, said second set of planetary pinions meshing with an intermediate sun gear on said driven element, and intermediate reaction ring gear meshing with said second planetary pinions, means to hold said intermediate reaction gear stationary to provide intermediate ratio, clutch means to connect said intermediate reaction ring gear and said driven element to provide low ratio, forward and reverse control means operably connected to said means to hold said forward reaction gear and said reverse reaction gear for selectively actuating said means to hold said forward reaction gear stationary and said means to hold said reverse reaction gear stationary, and ratio control means operably connected to said means to hold said high reaction gear stationary, said means to hold said intermediate reaction gear stationary, and said clutch means for selectively actuating said means to hold said high reaction gear, said intermediate reaction gear and said clutch means.

24. In a control system for fluid motors, first fluid pressure actuated motor means, second fluid pressure actuated motor means, a source of fluid under pressure, a first supply line connecting said source of fluid pressure to said first motor means, a second supply line connecting said source of fluid pressure to said second motor means, valve means in said lines having a neutral position in which both of said lines are blocked, said valve means connecting said first and second supply lines to said first and second motor means and continuing to block said second and first supply lines during movement from said neutral position in opposite directions toward a first and second position respectively, said valve having a first and a second unbalanced area, said fluid pressure actuating said first and second motor means acting on said first and second unbalanced areas of said valve to resist movement of said valve toward said first and second positions respectively, and said valve means directing said fluid to said first and second supply line for said first and second motor means and blocking said fluid from said first and second unbalanced areas and venting said fluid contacting said unbalanced area when the valve means is in said first and second positions respectively so that the valve is at rest in said first and second positions.

25. In a control system for fluid motors, first fluid pressure actuated motor means, a second fluid pressure actuated motor means, a source of fluid under pressure, a first supply line connecting said source of fluid pressure to said first motor means, a second supply line connecting said source of fluid pressure to said second motor means, valve means in said lines having a neutral position in which both of said lines are blocked, said valve means connecting said first line to said first fluid pressure actuated motor means and continuing to block said second supply line during movement from said neutral position toward a second position, said valve having an unbalanced area, said fluid pressure actuating said first fluid pressure actuated motor means acting on said unbalanced area of said valve to resist movement of said valve toward said second position, said valve means directing said fluid to said first line for said first fluid actuated motor means and blocking said fluid from said unbalanced area and having a dashpot to resist further movement when the valve means approaches said second position so that the valve is at rest in said second position, and said dashpot permitting movement to said second position.

References Cited in the file of this patent

UNITED STATES PATENTS

| | | |
|---|---|---|
| 1,660,997 | Kearby | Feb. 28, 1928 |
| 2,232,797 | Neracher et al. | Feb. 25, 1941 |
| 2,287,279 | Stumpf | June 23, 1942 |
| 2,351,628 | Murray | June 20, 1944 |
| 2,370,859 | Hale | Mar. 6, 1945 |
| 2,448,822 | Pinardi et al. | Sept. 7, 1948 |
| 2,527,820 | Johnson et al. | Oct. 31, 1950 |
| 2,597,598 | Robison | May 20, 1952 |
| 2,799,179 | Kelbel et al. | July 16, 1957 |

UNITED STATES PATENT OFFICE
CERTIFICATE OF CORRECTION

Patent No. 3,016,769            January 16, 1962

Howard W. Christenson et al.

It is hereby certified that error appears in the above numbered patent requiring correction and that the said Letters Patent should read as corrected below.

Column 10, line 54, for "439" -- read -- 438 --; column 14, line 34, for "stands" read -- lands --; column 23, line 48, for "said fluid pressure" read -- said first fluid pressure --.

Signed and sealed this 8th day of May 1962.

(SEAL)
Attest:

ERNEST W. SWIDER            DAVID L. LADD
Attesting Officer            Commissioner of Patents